(12) United States Patent
Namboodiri

(10) Patent No.: US 8,692,935 B1
(45) Date of Patent: Apr. 8, 2014

(54) VIDEO INTERPOLATION MODE BASED ON MERIT

(71) Applicant: Marvell International Ltd., Hamilton (BM)

(72) Inventor: Vipin Namboodiri, Bangalore (IN)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 13/658,662

(22) Filed: Oct. 23, 2012

Related U.S. Application Data

(60) Provisional application No. 61/554,867, filed on Nov. 2, 2011.

(51) Int. Cl.
*H04N 7/01* (2006.01)
(52) U.S. Cl.
USPC .......................................... 348/459; 348/441

(58) Field of Classification Search
USPC .................. 348/459, 441, 443, 458, 444, 453
IPC ................................................ H04N 7/01,11/20
See application file for complete search history.

(56) References Cited

U.S. PATENT DOCUMENTS 7,129,987 B1 * 10/2006 Westwater .................... 348/441
2008/0231745 A1 * 9/2008 Ogino et al. .................. 348/441

* cited by examiner

*Primary Examiner* — Sherrie Hsia

(57) ABSTRACT

Embodiments of the present disclosure provide a method that comprises, based at least on two frames of a plurality of frames of a video stream, performing interpolation according to an interpolation mode to generate one or more interpolation frames. The method also comprises determining a merit of the interpolation based on one or more of (i) a measure of errors of the interpolation, and (ii) a measure of accuracy of one or more occlusion or reveal regions of the one or more interpolation frames. The method further comprises dynamically changing the interpolation mode based at least on the determined merit of the interpolation.

20 Claims, 6 Drawing Sheets

VIDEO INTERPOLATION MODE BASED ON MERIT

CROSS REFERENCE TO RELATED APPLICATIONS

This present disclosure claims priority to U.S. Provisional Patent Application No. 61/554,867, filed on Nov. 2, 2011, incorporated herein by reference.

TECHNICAL FIELD

Embodiments of the present disclosure relate to the field of video frame interpolation, and more particularly to techniques, devices, and systems for determining a mode of the interpolation based on interpolation performance.

BACKGROUND

Up-conversion of a video frame rate using frame rate conversion (FRC) utilizes frame interpolation to insert frames between consecutive frames of a video stream. For example, up-converting a video stream from 24 frames per second (fps), as in conventional analog video, to 120 fps, as in high-definition television, is performed by inserting four frames between consecutive frames of the original video. In an aggressive interpolation, all four inserted frames may be interpolation frames. In a defensive interpolation, only one or two of the inserted frames may be interpolation frames with the remaining being repeated frames of the original video feed. If interpolation is turned off or not being used, then all inserted frames are repeated frames.

In conventional video systems, users are provided with a setting, such as in a menu screen, to set the interpolation mode. Interpolation is used to avoid judder, or the appearance of shaking that can occur when repeating frames. But aggressive interpolation may result in artifacts created by interpolation errors. Often, users of conventional video systems may select a mid-level or "medium" interpolation setting to avoid the worst interpolation artifacts, thus balancing interpolation quality with the appearance of judder.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

In one embodiment, the present disclosure provides a method that comprises, based at least on two frames of a plurality of frames of a video stream, performing interpolation according to an interpolation mode to generate one or more interpolation frames. The method also comprises determining a merit of the interpolation based on one or more of (i) a measure of errors of the interpolation, and (ii) a measure of accuracy of one or more occlusion or reveal regions of the one or more interpolation frames. The method further comprises dynamically changing the interpolation mode based at least on the determined merit of the interpolation.

In another embodiment, the present disclosure provides an apparatus comprising an interpolator configured to perform an interpolation that results in one or more interpolation frames based on at least an interpolation mode and two frames of a video stream. The apparatus also comprises a performance checker configured to determine a merit of the interpolation based on a function of one or more of (i) a measure of errors of the interpolation, and (ii) a measure of accuracy of one or more occlusion or reveal regions of the one or more interpolation frames. The apparatus further comprises an interpolation mode selector configured to automatically select a new interpolation mode for the interpolation based at least on the merit of the interpolation.

In a further embodiment, the performance checker is further configured to determine the merit of interpolation further based on differences of luminance values of one or more of (i) one of the interpolation frames and one of the two frames of the video stream, and (ii) a forward interpolation frame and a reverse interpolation frame.

BRIEF DESCRIPTION OF THE DRAWINGS

Embodiments of the present disclosure will be readily understood by the following detailed description in conjunction with the accompanying drawings. To facilitate this description, like reference numerals designate like structural elements. Embodiments herein are illustrated by way of example and not by way of limitation in the figures of the accompanying drawings.

DETAILED DESCRIPTION

Video systems according to the present disclosure dynamically change an interpolation mode based on a merit or performance of the interpolation. In a video stream, there are sequences where a "safe" mode of interpolation is used to hide artifacts created by aggressive interpolation. And there are sequences within the same video stream where a more aggressive interpolation mode is used in order to avoid exhibiting judder and motion blur. Embodiments of the present disclosure identify those sequences automatically and dynamically adjust the interpolation quality.

Figure 1:
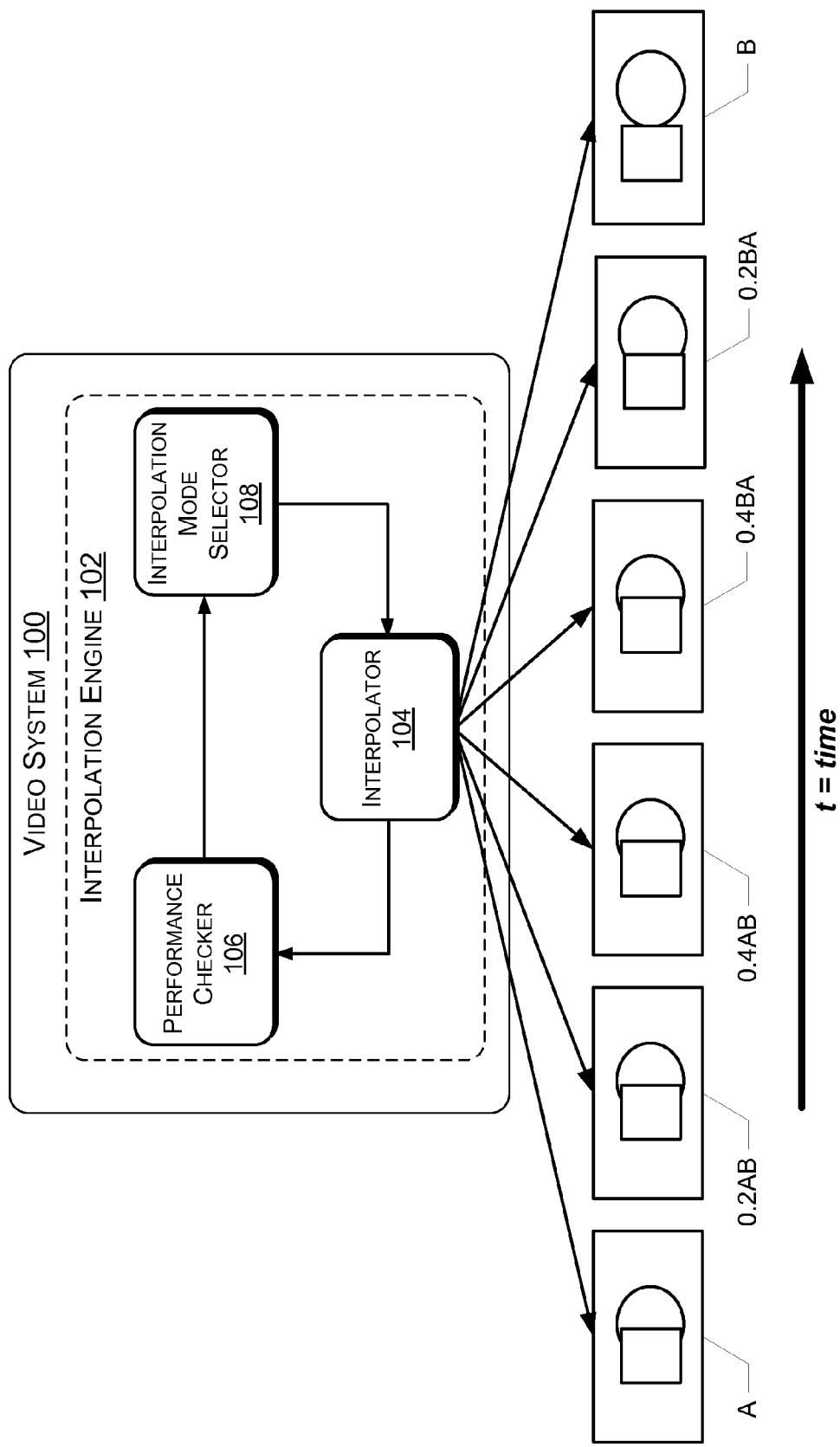
FIG. 1 is a schematic diagram of an example video system for dynamically setting an interpolation mode based on a merit of interpolation.
Figure 6:
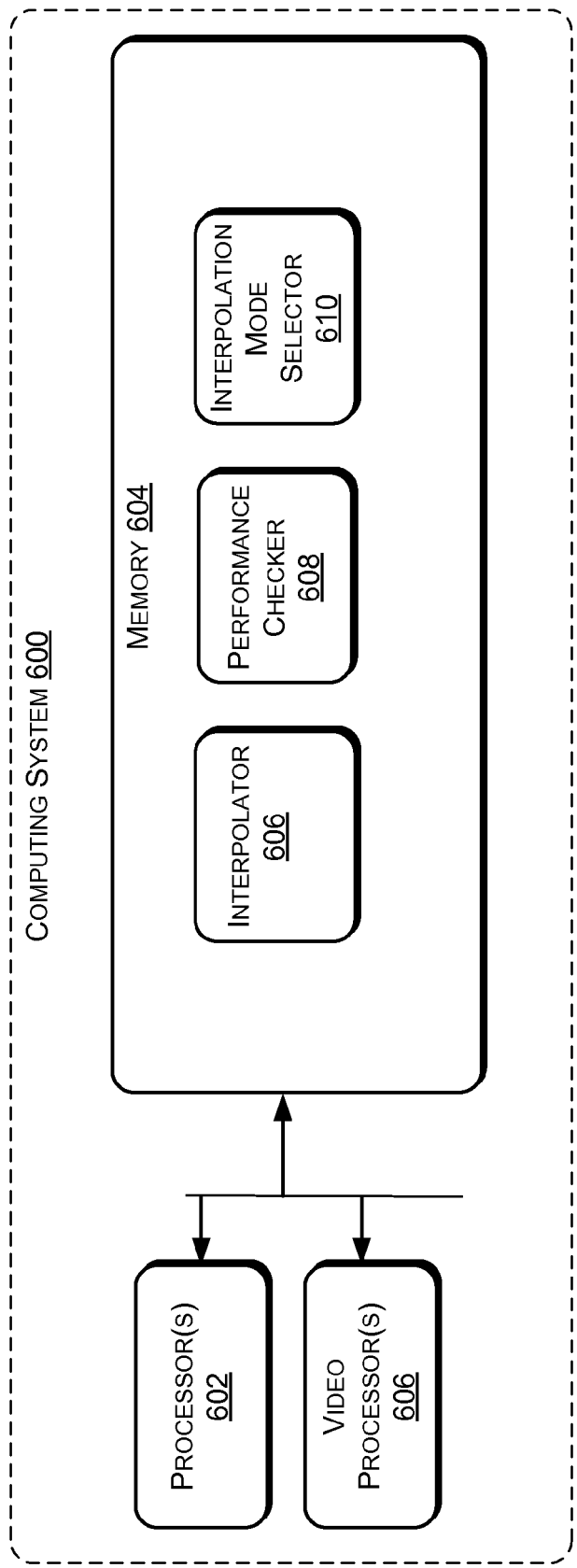
FIG. 6 is an example computing system usable to implement a software-based video system according to embodiments.

FIG. 1 is a schematic diagram of an example video system 100 for dynamically setting an interpolation mode based on a merit of interpolation. One or more aspects of the video system illustrated in FIG. 1, including one or more portions of the interpolation engine 102, may be implemented in hardware or a combination of hardware and software. The video system 100, including one or more portions of the interpolation engine 102, may be implemented within a video card, as part of a system on a chip, as a series of discrete hardware components, as one or more application specific integrated circuits (ASICs), as one or more field programmable gate arrays (FPGAs), or other hardware-based solution. One or more components of the video system 100, including one or more portions of the interpolation engine 102, may be software-based, such as may be stored in firmware in read-only memory (ROM) or flash memory, and configured to be executable by one or more processors. A software-implemented video system is illustrated in FIG. 6.

An interpolator 104 is configured to receive a plurality of video frames of a video stream, and to generate, according to an interpolation mode, interpolation frames based on the frames of the video stream. In the example shown in FIG. 1, frames A and B are received as part of the original video stream, with frame A coming just before frame B in a frame sequence of the original video stream. The interpolator 104 may be configured to up-convert the frame rate of the video stream to a higher frame rate. A one example, this involves up-converting from 24 fps or similar frame rate to 120 fps, which uses four inserted frames between consecutive frames of the original video stream. In the example shown in FIG. 1, an "aggressive" interpolation mode is utilized to generate the four interpolation frames 0.2AB, 0.4AB, 0.4BA, and 0.2BA. This nomenclature is explained below.

In a bi-directional motion estimation scheme, both forward and reverse motion tracks are identified. In forward interpolation, where original frame A comes before original frame B, the motion of objects in frame A are motion compensated to create interpolation frames that fall between frames A and B. A 0.2AB interpolation frame is generated from original frame A based on the objects in A at 20% of their projected trajectories from their respective positions in A to their respective positions in B. Likewise, 0.4AB, 0.6AB, and 0.8AB are interpolation frames with objects that are 40%, 60%, and 80% along their projected trajectories moving from their positions in from frame A to their positions in frame B.

In reverse interpolation, the motion of objects in frame B are motion compensated based on reverse trajectories of the objects in frame B, based on their positions in frame A. An 0.2BA frame is an interpolation frame that is generated from original frame B based on the objects in B that are at a point 20% of the way along their projected reverse trajectories from their positions in frame B to their positions in frame A. Likewise, 0.4BA, 0.6 BA, and 0.8BA are interpolation frames with objects that are 40%, 60%, and 80% along their projected reverse trajectories moving from frame B to A.

In the exemplary "aggressive" interpolation mode shown in FIG. 1, frame A is followed by forward interpolation frame 0.2AB, then by forward interpolation frame 0.4AB, then by reverse interpolation frame 0.4BA (which corresponds in time with forward interpolation frame 0.6AB), then by reverse interpolation frame 0.2BA (which corresponds in time with forward interpolation frame 0.8AB). Other "aggressive" interpolation schemes may be utilized in various embodiments, such as, for example, a sequence that goes A→0.2AB→0.4AB→0.4BA→0.2BA→B, and so forth. This example sequence is generally useful for an aggressive mode of interpolation for a frame rate up-conversion of 5 (for e.g., 24 Hz to 120 Hz). In a less aggressive interpolation mode, the frame sequence might be: A→A→0.25AB→0.5BA→0.25BA→B, and so forth. Embodiments of the present disclosure are not limited to any particular interpolation scheme or schemes.

A performance checker 106 determines a merit of the interpolation. The merit is determined based on one or more of a function of a measure of errors of the interpolation and a measure of accuracy of one or more occlusion or reveal regions of the one or more interpolation frames, as will be described in detail elsewhere within this Detailed Description. The performance checker 106 provides a qualitative measure of merit of the interpolation to the interpolation mode selector 108. Based on the measure of merit, the interpolation mode selector 108 chooses an interpolation mode for the interpolation. In general, where the measure of merit indicates that interpolation is performing well, the interpolation mode selector 108 may select a more aggressive interpolation mode. Where the measure of merit indicates that the interpolation is not performing well, the interpolation mode selector 108 may select a more defensive interpolation mode.

The selection of one of a plurality of interpolation modes based on merit of the interpolation may be based on predetermined criteria. For example, it may be predetermined based on test viewers' perceptions of noticeable errors and/or perceived degradation of test video sequences. This will be described in more detail below.

As noted above, the performance checker 106 determines a merit of the interpolation based on one or more of (i) a function of a measure of errors of the interpolation and (ii) a measure of accuracy of one or more occlusion or reveals regions of the one or more interpolation frames. These aspects will now be described.

Measure of Errors of Interpolation—FOM-SAD

The performance checker 106 checks for errors in the interpolation. Checking for errors may be accomplished using Peak Signal to Noise Ratio (PSNR) or Structural Similarity (SSIM). But comparing the differences in luminance (luma) values between the two frames is less computationally complex and provides a good indicator of the goodness of fit of the motion vector map. In general, if an interpolation performs well (e.g., has few errors) for frames that have solid objects with no deformations, occlusions, or reveal regions (described in more detail elsewhere within this Detailed Description), then interpolation frame 0.xyAB will be very similar to interpolation frame [1-0.xy]BA. Thus, the performance checker 106 may check for errors by comparing the luminance values of co-located pixels in an interpolation frame that is concurrent in time with one of the original video frames of the video stream. In other words, the performance checker 106 compares the luminance values in 0.xyAB to co-located luminance values in [1-0.xy]BA. Or the performance checker may compare the luminance values in 1.0AB (referred to herein as B') to B or 1.0BA (A') to A to determine the level of interpolation errors. Large variations in luma values between the two concurrent frames are indicative of errors in the motion vector mapping.

A sum of differences (SAD) of the luma values are used as the basis for block correlation in the motion registration functions of interpolation used in various types of frame rate compensation, such as Tucson Compensation. Thus, SAD may be readily available to the interpolation engine 102, and SAD is a comparison of the difference in the luma values of B and B'. Thus, embodiments may utilize SAD as the basis for comparing frames to determine a measure of the errors in interpolation.

The performance checker 106 determines a SAD map, or a two-dimensional image of difference values between the co-located pixels of B and B' (or any other two frames, including two interpolation frames that are concurrent in time with one another). The performance checker 106 analyzes the local density of errors, and pools the errors across the SAD map to arrive at a figure of merit based on a SAD (FOM-SAD) that indicates a qualitative indicator of the density of the motion vector map. In embodiments, the performance checker 106 compresses the SAD map into a one bit-per-pixel (BPP) map. To compress the SAD map, the performance checker 106 may set all pixels having a SAD of greater than a predetermined threshold to 1 (indicating an error), and all pixels having a SAD less than or equal to the threshold to 0 (indicating no error). The result is a one BPP map. The local density of errors of the compressed SAD map is computed using a density function. The errors are then pooled to arrive at the FOM-SAD.

Measure of Errors of Interpolation—FOM-ROD

The FOM-SAD measure does not necessarily capture the performance of interpolation in frames with occlusion and reveal, and it does not necessarily capture the performance of interpolation in frames with object deformation. Thus, embodiments of the performance checker 106 may determine a measure of the accuracy of occlusion and reveal regions in interpolation frames. Various embodiments may accomplish this by determining the consistency of the bi-directional motion vectors in the forward and reverse motion maps. Consistency in the bi-directional motion vectors indicates that the occlusion and reveal regions are consistent. A less computationally intensive mechanism of determining the accuracy of occlusion and reveal regions is to compare the reveal and occlusion regions in a forward interpolation frame to the reveal and occlusion regions in a concurrent reverse interpolation frame. Thus, the performance checker 106 compares the occlusion and/or reveal regions in 0.xyAB with the occlusion and reveal regions in [1-0.xy]BA. In particular, comparing the reveal and occlusion regions in interpolation frames 0.5AB and 0.5BA provides a good proxy for the consistency of the bi-directional motion vectors.

Figures 2A, 2B:
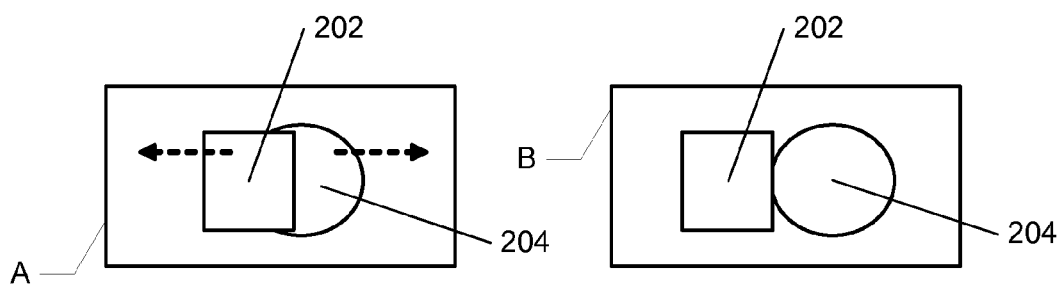
FIGS. 2A-D illustrate video frames and interpolation frames used to determine a merit of interpolation.
Figures 2C, 2D:
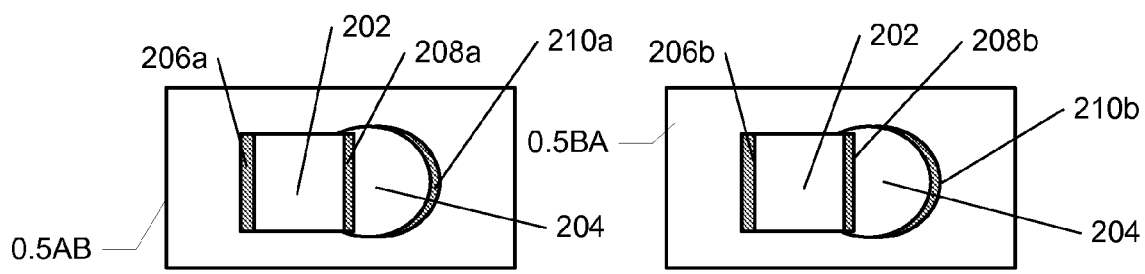

FIGS. 2A-D illustrate video frames and interpolation frames with reveal and occlusion regions. Original frames A and B, shown in FIG. 2A and FIG. 2B, respectively, correspond to the frames A and B illustrated in FIG. 1. As denoted by the dashed arrows in FIG. 2A, the square 202 and circle 204 objects in original frame A move away from each other. As shown in FIG. 2B, the square 202 and the circle 204 are shown as having moved in opposite directions resulting in less overlap than in the earlier frame A. The circle 204 is situated behind the square 202, and thus as the two objects move away from each other, portions of the square 202 and the circle 204 are revealed and/or occluded. These portions are referred to as "holes." FIG. 2C illustrates forward interpolation frame 0.5AB and FIG. 2D illustrates reverse interpolation frame 0.5BA. Comparing the occluded and/or revealed holes 206a, 208a, and 210a of the forward interpolation frame 0.5AB shown in FIG. 2A with the occluded and/or revealed holes 206b, 208b, and 210b of the reverse interpolation frame 0.5BA shown in FIG. 2B provides a measure of the performance of the interpolation in dealing with occlusion and reveal regions. The "hole" in the frames may also account for object deformation.

If the holes 206a, 208a, and 210a are the same or similar to the holes 206b, 208b, and 210b, then that indicates consistency in the bi-directional motion maps. Referring again to FIG. 1, the performance checker 106 either computes 0.5AB and 0.5BA or receives them from the interpolator 104. The computational cost of computing these interpolation frames can be mitigated by doing a sparse field interpolation. In a sparse field interpolation, a horizontally and vertically subsampled motion vector map is computed. The performance checker 106 maps differences the 0.5AB and 0.5BA frames onto a map. In embodiments, the performance checker maps difference in the holes of the 0.5AB and the 0.5BA frames on the map. The map is compressed to a one BPP map, such as by utilizing a threshold difference to set the pixels in the map to either a "1" or a "0" similar to as described above in the computation of the FOM-SAD. The performance checker 106 utilizes a local density function to capture distortions in the occlusion and/or reveal regions, as well as deformations, in a localized area. The errors may be pooled over the image to obtain a measure of the accuracy of the reveal occlusion and deformations (FOM-ROD). The performance checker 106 inputs the FOM-SAD and the FOM-ROD into a function to achieve an overall FOM for the interpolation. FOM=f (FOM-SAD, FOM-rod). The FOM is provided to the interpolation mode selector 108 to determine the interpolation mode based on a predetermined FOM mapping.

FOM Function Determination

To arrive at a FOM function, test viewers may be shown a collage of sequences, having various FOM scores as calculated according to embodiments, and the viewers' mean opinion scores (MOS) of the sequences are recorded. The viewers' MOS results are used to determine a mapping of FOMs to viewers' perception of quality. The Interpolation Merit and Perceived impairment columns in the following table are based on the MOS scoring system for voice quality tests described in ITU-T recommendation P.800, but embodiments are not limited to any MOS scoring system or systems.

| Interpolation Merit | Perceived Impairment |
|---|---|
| Excellent | Imperceptible |
| Good | Perceptible but not annoying |
| Fair | Slightly annoying |
| Poor | Annoying |
| Bad | Very Annoying |

Once the viewers' Mean Opinion Scores (MOS) are recorded, a function that correlates FOMs to viewer MOS values can be deconstructed and represented as a mathematical function. The function may be a linear function or close to a linear function. In other embodiments, the function may be a non-linear function.

Interpolation Mode Selection

The interpolation mode selector 108 may attempt to maintain a certain interpolation quality such as "Excellent" or "Good". If the performance checker 106 determines that a particular sequence has a relatively low FOM, then the interpolation mode selector may dynamically select a less aggressive interpolation mode and step down to an interpolation mode that results in a "Good", "Excellent", or "Fair" FOM. Other labels may be used to describe different interpolation modes without departing from the scope of the present disclosure. Also, where the FOM is relatively high, the interpolation mode selector 108 may step up to a more aggressive mode as long as the interpolation performance remains "Good", "Fair", or "Excellent." The interpolation mode selector 108 may use a first predetermined threshold to determine whether to select a less aggressive interpolation mode and a second predetermined threshold to determine whether to select a more aggressive interpolation mode, such that the interpolation mode selector 108 attempts to maintain the FOM above a certain threshold, and waits until the FOM reaches another higher threshold before stepping up to a more aggressive interpolation. The interpolation mode selector 108 may also implement a change delay timer to avoid switching between interpolation modes too quickly.

The following table illustrates an example interpolation scheme that may be applied for a frame rate up-conversion factor of 5 (for e.g., 24 Hz to 120 Hz). Other interpolation schemes may be utilized in various embodiments without departing from the scope of the present disclosure.

| Interpolation Mode | Frame Sequence |
|---|---|
| Aggressive | A → 0.2AB → 0.4AB → 0.4BA → 0.2BA → B |
| Medium | A → A → 0.25AB → 0.5BA → 0.25BA → B |
| Defensive | A → A → 0.33AB → 0.33BA → B → B |
| None | A → A → A → A → A → B |
| None | A → A → A → A → A → B |

The interpolation engine 102 thus implements a state machine that dynamically determines an interpolation performance and automatically adjusts the interpolation mode based on the interpolation performance. The result may be improved overall perceived video quality without requiring user intervention (although, in various embodiments, a manual setting may enable a user to set a particular interpolation mode as well as to select dynamic interpolation). In embodiments, the user may select a target interpolation performance, such as "Excellent," "Good," or "Fair" that the interpolation mode selector 108 attempts to maintain at a minimum. This enables the user to select the balance between judder and interpolation quality that the interpolation engine 102 attempts to dynamically achieve.

Figure 3:
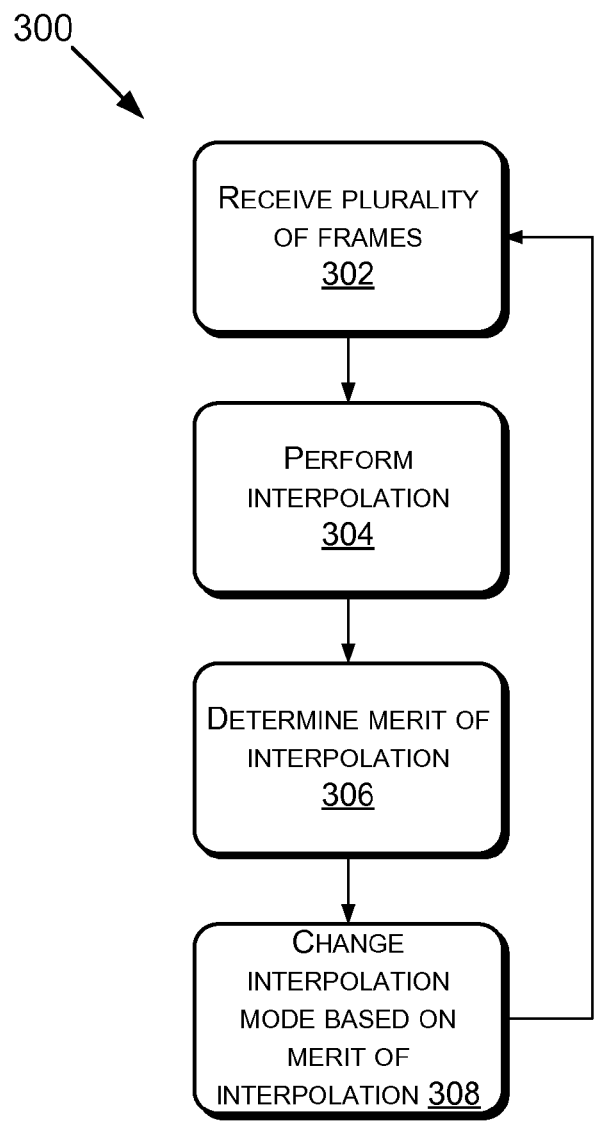
FIG. 3 is a flowchart showing an example process of dynamically setting an interpolation mode based on merit of interpolation, in accordance with various embodiments.

FIG. 3 is a flowchart showing an example process of dynamically setting an interpolation mode based on merit of interpolation, in accordance with various embodiments. At 302, an interpolation engine, such as interpolation engine 102, receives a plurality of frames of a video stream.

At 304, an interpolator, such as the interpolator 104, performs interpolation to insert frames into the video stream. The interpolation engine may be configured to perform frame rate compensation to up-convert the frame rate to a higher frame rate, and the interpolation may be performed as part that process. The interpolation is performed according to an interpolation mode, which determines the number of inserted frames that are interpolated frames and the number that are repeated frames.

At 306, an interpolation checker, such as the interpolation checker 106, determines a merit of the interpolation based on one or more of a measure of errors of the interpolation (such as the FOM-SAD described elsewhere within this Detailed Description) or a measure of accuracy of one or more occlusion or reveal regions of the one or more interpolation frames (such as the FOM-ROD described elsewhere within this Detailed Description).

At 308, an interpolation mode selector, such as the interpolation mode selector 108, dynamically changes the interpolation mode based at least on the determined merit of the interpolation. A relatively low merit of interpolation results in stepping down to a less aggressive interpolation mode, and a relatively high merit of interpolation results in stepping up to a more aggressive interpolation mode.

Figure 4:
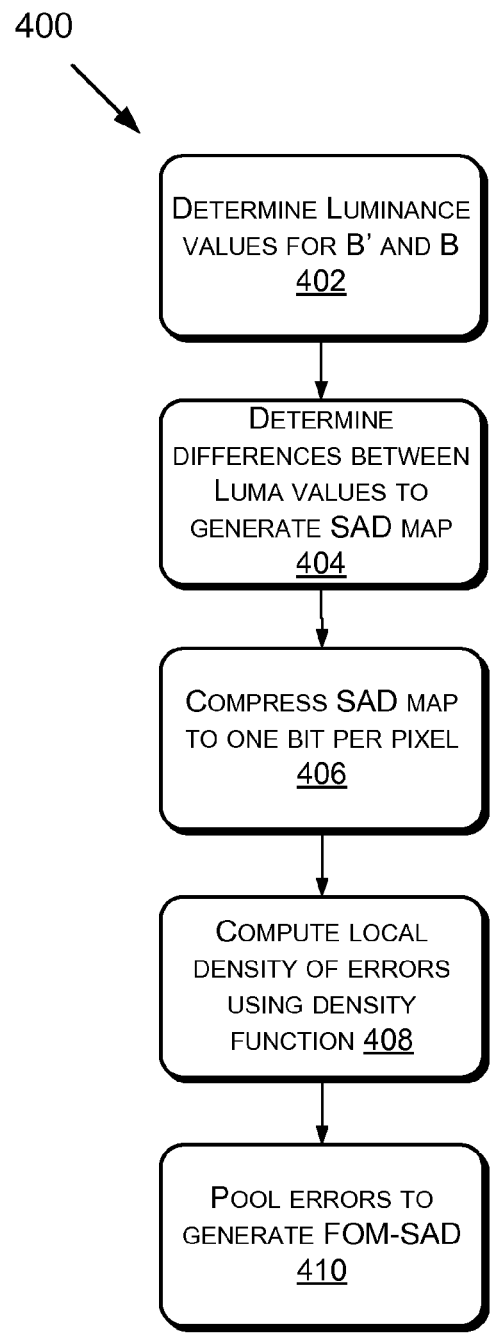
FIG. 4 is a flowchart showing an example process of determining a figure of merit based on errors of the interpolation.

FIG. 4 is a flowchart showing an example process of determining a figure of merit based on errors of the interpolation. At 402, a performance checker, such as the performance checker 106, determines luminance values for two frames that are concurrent in time, with at least one of the two frames being an interpolation frame. The performance checker may either perform the interpolation that results in the interpolation frame or receives the interpolation frame from an interpolator. In various embodiments, one of the frames is an interpolation frame and the other frame is an original frame of the video stream, with the interpolation frame being concurrent in time with the original frame of the video stream. For example, the original frame of the video stream may be frame B and the interpolation frame may be 1.0AB (i.e., B'). In a more general case, the two frames are 0.xyAB and [1-0.xy]BA (where 0AB=A, and 0BA=B).

At 404, the performance checker determines differences between co-located luma values of the two frames that are concurrent in time in order to generate a SAD map. At 406, the SAD map is compressed to a one BPP map. This may be accomplished by setting all pixels in the SAD map that exceed a threshold to a "1" to indicate an error, and all other pixels to a "0" to indicate no error.

At 408, the performance checker computes local density of errors using a density function. And at 410, the errors are pooled across the map to generate the FOM-SAD.

Figure 5:
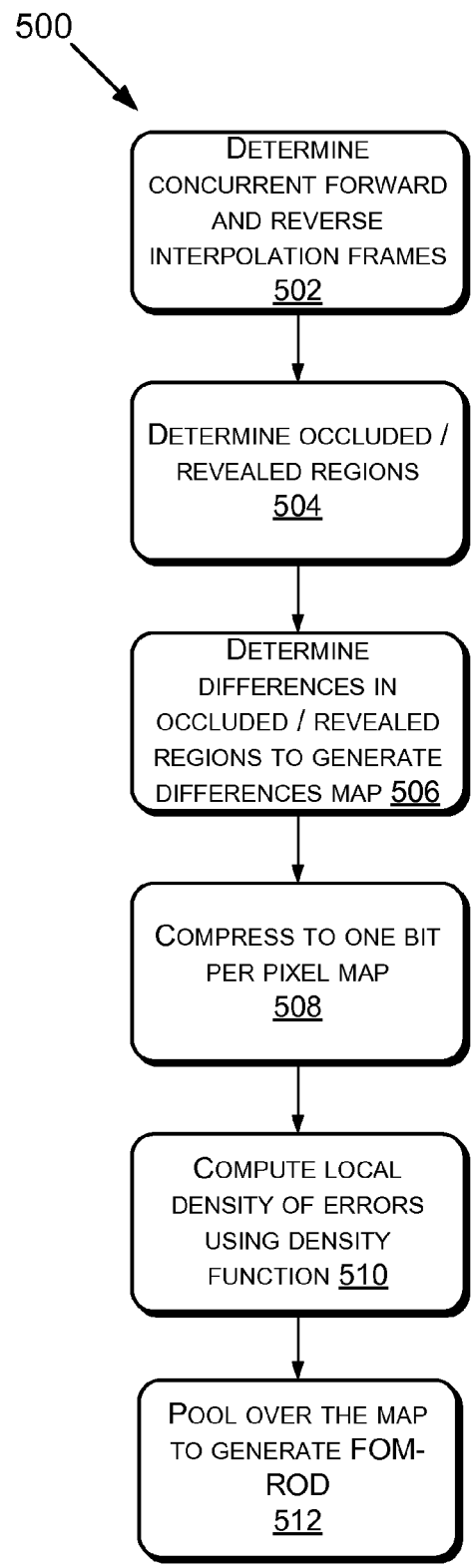
FIG. 5 is a flowchart showing an example process of determining a figure of merit based on occluded and reveal regions in interpolation frames, in accordance with various embodiments.

FIG. 5 is a flowchart showing an example process of determining a figure of merit based on occluded and reveal regions in interpolation frames, in accordance with various embodiments. At 502, concurrent forward and reverse interpolation frames are determined. The determined frames may be generated by an interpolator, or by the performance checker. The frames may be 0.5AB and 05BA frames. In a more general case, the frames may be 0.xyAB and [1-0.xy]BA.

At 504, the occluded and reveal regions of the forward and reverse interpolated frames may be determined. Determining the occluded and reveal regions may be determined by comparing the interpolation frames to the original frames of the video stream, or by some other method.

At 506, the performance checker may determine differences between the occluded and revealed regions of the concurrent interpolation frames to generate a differences map. The differences may be determined by calculating differences in the luma values of co-located pixels of the occluded and revealed regions of the concurrent interpolation frames.

At 508, the differences map is compressed to a one BPP map, such as by setting all pixels above a predetermined threshold to a "1" to represent an error, and all other pixels to a "0" to represent no error. At 510, local density of errors is computed using a density function. At 512, the errors are pooled across the compressed map to generate the FOM-ROD.

FIG. 6 illustrates an exemplary computing system 600 usable to implement a video service in accordance with various embodiments. The computing system 600 may be configured as any suitable computing device capable of implementing a video service. According to various non-limiting examples, suitable computing devices may include personal computers (PCs), servers, server farms, datacenters, tablet computers, smartphones, personal data assistants, game consoles, combinations of these, or any other computing device(s) capable of storing and executing all or part of a video service.

In one example configuration, the computing system 600 comprises one or more processors 602 and memory 604. The memory 604 may store program instructions that are loadable and executable on the processor(s) 602, as well as data generated during execution of, and/or usable in conjunction with, these programs. In the illustrated example, memory 604 includes an interpolator 606, which may be the same as or similar to the interpolator 104. The interpolator 606 may perform interpolation as part of a frame rate compensation, as described elsewhere within this Detailed Description. Some or all of the interpolation functions of the interpolator 606 may be performed by one or more video processor(s) 602. The memory 604 also includes a performance checker 608 and an interpolation mode selector 610, which may be the same as or similar to the performance checker 106 and the interpolation mode selector 610, respectively.

Computer-Readable Media

Depending on the configuration and type of computing system used, memory 604 may include volatile memory (such as random access memory (RAM)) and/or non-volatile memory (such as read-only memory (ROM), flash memory, etc.). Memory 604 may also include additional removable storage and/or non-removable storage including, but not limited to, flash memory, magnetic storage, optical storage, and/or tape storage that may provide non-volatile storage of computer readable instructions, data structures, program modules, and other data.

Memory 604 is an example of computer-readable media. Computer-readable media includes at least two types of computer-readable media, namely computer storage media and communications media.

Computer storage media includes volatile and non-volatile, removable and non-removable media implemented in any method or technology for storage of information such as computer-readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer-readable instructions, data structures, program modules, or other data in a modulated data signal, such as a carrier wave, or other transmission mechanism. As defined herein, computer storage media does not include communication media.

CONCLUSION

Various operations are described as multiple discrete operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments. Operations of processes 300, 400, and 500 can be suitably combined and may comport with techniques and/or configurations described in connection with FIGS. 1 and 6 in various embodiments.

For the purposes of the present disclosure, the phrase "A/B" means A or B. For the purposes of the present disclosure, the phrase "A and/or B" means "(A), (B), or (A and B)." For the purposes of the present disclosure, the phrase "at least one of A, B, and C" means "(A), (B), (C), (A and B), (A and C), (B and C), or (A, B and C)." For the purposes of the present disclosure, the phrase "(A)B" means "(B) or (AB)" that is, A is an optional element.

The description uses the phrases "in an embodiment," "in embodiments," or similar language, which may each refer to one or more of the same or different embodiments. Furthermore, the terms "comprising," "including," "having," and the like, as used with respect to embodiments of the present disclosure, are synonymous.

Although certain embodiments have been illustrated and described herein, a wide variety of alternate and/or equivalent embodiments or implementations calculated to achieve the same purposes may be substituted for the embodiments illustrated and described without departing from the scope of the present disclosure. This disclosure is intended to cover any adaptations or variations of the embodiments discussed herein. Therefore, it is manifestly intended that embodiments described herein be limited only by the claims and the equivalents thereof.

What is claimed is:

1. A method, comprising:
    based at least on two frames of a plurality of frames of a video stream, performing interpolation according to an interpolation mode to generate one or more interpolation frames;
    determining a merit of the interpolation based on one or more of (i) a measure of errors of the interpolation, and (ii) a measure of accuracy of one or more occlusion or reveal regions of the one or more interpolation frames; and
    dynamically changing the interpolation mode based at least on the determined merit of the interpolation.

2. The method of claim 1, wherein the merit of interpolation is determined further based on a function of both (i) the measure of errors of the interpolation and (ii) the measure of accuracy of one or more occlusion or reveal regions of the one or more interpolation frames.

3. The method of claim 2, further comprising determining the measure of errors of the interpolation based at least on a sum of absolute differences (SAD) of luminance values of (i) one of the interpolation frames, and (ii) one of the two frames of the video stream.

4. The method of claim 3, wherein the one of the interpolation frames is concurrent in time with the one of the two frames according to a sequence of the video stream.

5. The method of claim 3, wherein:
    the one of the interpolation frames is a forward interpolation frame; and
    the one of the two frames is later in time than the other one of the two frames according to a sequence of the video stream.

6. The method of claim 3, wherein the determining the measure of errors of the interpolation comprises:
    (i) generating a SAD map of the one of the interpolation frames and the one of the two frames of the video stream;
    (ii) compressing the SAD map into a one bit-per-pixel map; and
    (iii) utilizing a local density function to generate a figure of merit for the measure of errors of the interpolation.

7. The method of claim 2, wherein the measure of the accuracy of the one or more occlusion or reveal regions of the one or more interpolation frames is based on differences in luminance values of (i) a forward interpolation frame, and (ii) a reverse interpolation frame.

8. The method of claim 7, wherein the forward interpretation frame and the reverse interpolation frame are concurrent in time according to a sequence of the video stream.

9. The method of claim 7, wherein the determining the measure of the accuracy of the one or more occlusion or reveal regions comprises:
    (i) generating a differences map of the forward interpolation frame and the reverse interpolation frame based on the differences in luminance values;
    (ii) compressing the differences map into a one bit-per-pixel map; and (iii) utilizing a local density function to generate a figure of merit for the measure of the accuracy of the one or more occlusion or reveal regions.

10. The method of claim 1, wherein the interpolation mode establishes a number of interpolation frames and a number of repeat frames inserted into the video stream as part of a frame rate compensation of the video stream.

11. An apparatus, comprising:
an interpolator configured to perform an interpolation that results in one or more interpolation frames based on at least an interpolation mode and two frames of a video stream;
a performance checker configured to determine a merit of the interpolation based on a function of one or more of (i) a measure of errors of the interpolation, and (ii) a measure of accuracy of one or more occlusion or reveal regions of the one or more interpolation frames; and
an interpolation mode selector configured to automatically select a new interpolation mode for the interpolation based at least on the merit of the interpolation.

12. The apparatus of claim 11, wherein the performance checker is further configured to determine the merit of interpolation further based on differences of luminance values of one or more of:
(i) one of the interpolation frames and one of the two frames of the video stream; and
(ii) a forward interpolation frame and a reverse interpolation frame.

13. The apparatus of claim 12, wherein the performance checker is further configured to:
determine one or more one-bit-per-pixel maps based on the differences of luminance values; and
utilize one or more local density functions on the one or more one-bit-per-pixel maps to generate a qualitative measure of the merit of interpolation.

14. The apparatus of claim 11, wherein the interpolation mode establishes (i) a number of interpolation frames and (ii) a number of repeat frames inserted into the video stream as part of a frame rate compensation of the video stream.

15. One or more computer-readable storage media storing a plurality of instructions executable by one or more processors of a computing system to cause the computing system to:
based at least on two frames of a plurality of frames of a video stream, perform interpolation according to an interpolation mode to generate one or more interpolation frames;
determine a merit of the interpolation based on one or more of (i) a measure of errors of the interpolation, and (ii) a measure of accuracy of one or more occlusion or reveal regions of the one or more interpolation frames; and
change the interpolation mode based at least on the determined merit of the interpolation.

16. The one or more computer-readable storage media of claim 15, wherein the merit of interpolation is determined further based on a function of both (i) the measure of errors of the interpolation and (ii) the measure of accuracy of one or more occlusion or reveal regions of the one or more interpolation frames.

17. The one or more computer-readable media of claim 15, and wherein measure of errors of the interpolation is based at least on a sum of absolute differences (SAD) of luminance values of the at least one of the interpolation frames and luminance values of at least one of the two frames of the video stream, wherein the at least one of the interpolation frames and the at least one of the two frames of the video stream are concurrent in time according to a sequence of the video stream.

18. The one or more computer-readable media of claim 15, wherein the merit of interpolation is determined further based on a measure of accuracy of one or more occlusion or reveal regions of the one or more interpolation frames, wherein the measure of accuracy of one or more occlusion or reveal regions of the one or more interpolation frames is based at least on a difference map of luminance values of the forward interpolation frame and reverse interpolation frame, wherein the forward interpolation frame and the reverse interpolation frame are concurrent in time according to a sequence of the video stream.

19. The one or more computer-readable media of claim 15, wherein the at least one of the interpolation frames is a forward interpolation frame, and wherein measure of errors of the interpolation is based at least on a sum of absolute differences (SAD) of luminance values of the forward interpolation frame and luminance values of a reverse interpolation frame, wherein the forward interpolation frames and the reverse interpolation frame of the video stream are concurrent in time according to a sequence of the video stream.

20. The one or more computer-readable media of claim 15, wherein the interpolation mode establishes a number of interpolation frames and a number of repeat frames inserted into the video stream as part of a frame rate compensation of the video stream.

\* \* \* \* \*